United States Patent
Merzweiler et al.

[19]

[11] Patent Number: 6,125,577
[45] Date of Patent: Oct. 3, 2000

[54] TRAY FOR POTTED PLANTS

[75] Inventors: Robert Merzweiler, Akron; David Bokmiller, Hudson, both of Ohio

[73] Assignee: Landmark Plastics Corporation, Akron, Ohio

[21] Appl. No.: 09/154,346

[22] Filed: Sep. 16, 1998

[51] Int. Cl.[7] .................................................. A47G 7/02
[52] U.S. Cl. .................................................. 47/39; 47/66.5
[58] Field of Search ................... 47/39, 86, 66.5; 248/146, 311.2

[56] References Cited

U.S. PATENT DOCUMENTS

| | | | |
|---|---|---|---|
| D. 229,073 | 11/1973 | Brickel | D30/16 |
| 1,989,403 | 1/1935 | Dauernheim | 47/39 |
| 2,704,928 | 3/1955 | Curry | 62/108.5 |
| 3,542,210 | 11/1970 | Sorensen | 211/74 |
| 3,825,126 | 7/1974 | Pohl et al. | 211/71 |
| 4,213,271 | 7/1980 | Petruzzi et al. | 47/39 |
| 4,242,834 | 1/1981 | Olsen | 47/86 X |
| 4,532,891 | 8/1985 | Jones | 119/51 FS |
| 4,597,550 | 7/1986 | Rice, Sr. | 248/146 |
| 4,756,119 | 7/1988 | Chabot | 47/39 |
| 5,152,098 | 10/1992 | Hall | 47/39 |
| 5,174,534 | 12/1992 | Mitchell | 248/311.2 |
| 5,511,755 | 4/1996 | Spyrkerman | 248/311.2 |

FOREIGN PATENT DOCUMENTS

| | | | |
|---|---|---|---|
| 0 635 201 A1 | 1/1995 | European Pat. Off. | 47/86 |
| 2442005 | 6/1980 | France | 47/39 |
| 2 318 187 | 1/1974 | Germany | 47/39 |
| 7613359 | 12/1976 | Netherlands | 47/39 |
| 7713224 | 11/1977 | Netherlands | 47/39 |

*Primary Examiner*—Michael J. Carone
*Assistant Examiner*—Jeffrey L. Gellner
*Attorney, Agent, or Firm*—Oldham & Oldham Co., LPA

[57] ABSTRACT

The invention relates to a plant tray for holding and supporting potted plants. The invention includes a spacer support rack and at least one riser with a ring at its topmost surface. Within the ring is a plurality of tabs for supporting plant pots of different sizes. The spacer support rack is configured to allow equal spacing between the plants when placed in the plant tray. This allows for optimization of the health of the plant and the space available to the grower. The spacer support rack is constructed in a manner that multiple plant trays can be nested on top of each other, allowing them to be stored in a directly vertical arrangement maximizing the use of the storage space available.

5 Claims, 4 Drawing Sheets

TRAY FOR POTTED PLANTS

FIELD OF THE INVENTION

The invention relates generally to a tray for use in growing plants and specifically to a tray that is used to support potted plants. The tray is to be used by placing it on the ground, such as in a field, or on any relatively flat open area. The plants will be grown or stored in separate pots supported by the tray. The present invention allows the plants to be easily grown and optionally transported for sale with optimum growing conditions and lowered related costs of growing plants.

BACKGROUND

Being able to effectively and efficiently grow plants for sale to the public is a concern of those involved in this business venture. Flowering plants, such as Chrysanthemums (or Mums as they are often called), are highly beneficial to growers because they can be effectively and profitably grown year round. Mums require proper spacing and sufficient drainage, among other things, in order to grow well. Meeting these requirements and keeping costs down is a primary concern of growers. At present, there are various methods to growing plants which will in turn be placed in pots for sale to the public. The field method requires plants to be planted in the soil, provided with fertilizer and water and then removed and placed into pots in which they will be sold. In another method plants are planted into the pots, and grown indoors while being provided with the proper amounts of water and nutrients. These methods are labor intensive and can cause a substantial loss of plants. The present invention allows growers to plant the plant directly into the pot and allows the plants to be grown in the field where they were previously grown. The present invention also aids the grower in meeting the plants needs by retaining the plants at a suitable and constant spacing between plants and allowing for drainage of the plant pots. Further, the present invention allows the cost of these operations to be lowered by lowering labor cost, and by lowering the cost of losing plants to the previous growing and removal system.

SUMMARY OF THE INVENTION

In the preferred embodiment of the current invention, the plant tray takes the form of a support spacer and a set of upwardly extending risers that can hold and support planting pots of differing sizes. Within each riser is a plurality of tabs that can be manufactured in different sizes to facilitate the holding and supporting of different size pots. Each unit may contain any number of risers to effectively grow a myriad of different plant types within the plant pots. The riser is integrally attached to the support spacer. The riser holds the pot in a way that there is an air space between the bottom of the pot and the ground or other surface the plant tray is placed upon. This allows for better drainage of the pot, thus inhibiting root rot and build-up of salts, which are causes of plant death and increased cost of growing. This also keeps the root growth within the pot itself, since root tips will stop growing when exposed to the atmosphere. Since the root growth is kept within the pot, the plant's roots do not grow into the ground, which aids in the removal of the plant for transport and sale, and decreases labor costs associated with this process. This layer also allows for better temperature stability, especially where the tray is placed on a surface such as concrete or asphalt where the intense heat could cause plant loss or damage. The support spacer allows the growers to space the plants an equal distance apart, optimizing the space available to the grower and also optimizing the space the plant has and needs to grow. This space can be changed depending on the plant type that is to be grown. The plant tray retains the pot in an upright position even under windy conditions. This allows for a decrease in labor costs incurred in having to stand the mums or other plants up after being blown over by the wind. The plant tray is reusable and also nestable with identical or similar plant trays when not in use. The plant trays nest on top of each other in a straight vertical arrangement, allowing for the maximum use of the available storage space. Incorporated into the support spacer is a set of handles that allows the grower to easily grasp the tray with or without plants sitting inside the tray. The plant tray will be held down to the ground by the weight of the plant in the pot and/or by an optional stake that is driven into the ground to hold the tray in place, or where the tray is not on soil, any other weight could be placed on the support spacer to hold it in place.

Currently any excess fertilizer, herbicide or pesticide solutions used on the plants are allowed to leech into the ground or are improperly disposed such as when they are allowed to run off into drainage ditches and other sewer systems. In the situation where the plant trays and the plants are placed on a surface other than soil, the present invention allows for the collection of fertilizer, herbicide or pesticide solutions for reuse or for proper disposal.

It is an object of the present invention to allow growers to produce healthier and heartier potted plants with decreased costs and decreased plant losses. It is a further object of the present invention to provide growers a plant tray that is reusable and easily and compactly stored when not in use. These and other objects and advantages of the invention, as well as the details of illustrative embodiments, will be more fully understood form the following specification and drawings.

DETAILED DESCRIPTION OF THE PREFERRED EMBODIMENT

Reference will now be made in detail to the present preferred embodiments of the present invention, examples of which are illustrated in the accompanying drawings. Whenever possible, the same reference numbers will be used throughout the drawings to refer to the same or like parts.

Figure 1:
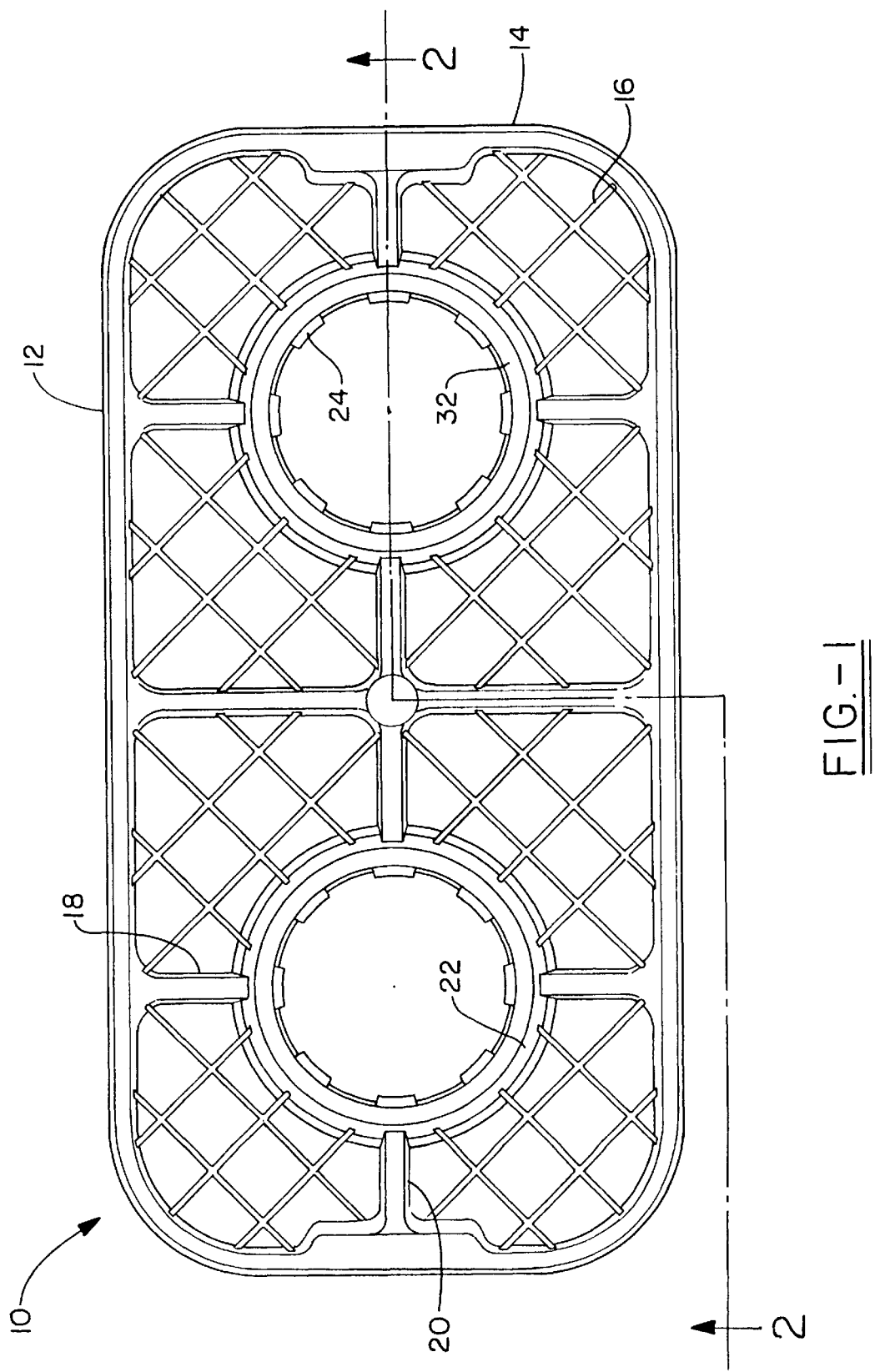
FIG. 1 is a top (plan) view of the plant tray according to the present invention.

Referring to FIG. 1, a plant tray in accordance to the present invention is shown generally at 10, and is comprised of a support spacer having an outer support rim 12, at least one longitudinal cross member 20, a plurality of lateral cross members 18 and a plurality of risers 22 in which potted plants may be held in place. Preferably, the risers 22 will be cylindrical in shape but may be formed into different shapes to accommodate different shaped plant pots. Within the area created between the longitudinal cross member 20 and the lateral cross members 18 is reinforcement webbing 16 which adds strength to the tray and prevents torsional twisting of the plant tray. When necessary, the reinforcement webbing 16 can be used to keep the plant tray in place by placing a stake through the webbing or placing weights on top of the webbing. Further, the plant tray of the present invention can be molded in order that similar adjacent trays can interlock with each other to keep the plant trays in place. At each end of the longitudinal cross member 20 is a handle 14 which allows the plant tray to be easily grasped and transported.

To grow optimally, Chrysanthemums like all other plants require sufficient spacing. The plant tray allows for equal spacing between the pots, which in turn creates equal spacing between the plants. Preferably, as multiple plant trays are placed end to end, or side to side, the space between each riser 22, and therefore between each plant, remains equidistant. The spacing required by different plants can be accomplished by the overall size of the plant tray itself and/or the number of risers 22 are incorporated into the plant tray. If the plant size is small and the required spacing for the plant is also minimal, more risers 22 can be formed into the plant tray, and vice versa. This arrangement optimizes the health of the plant while at the same time maximizing the space available to the grower.

Figure 2:
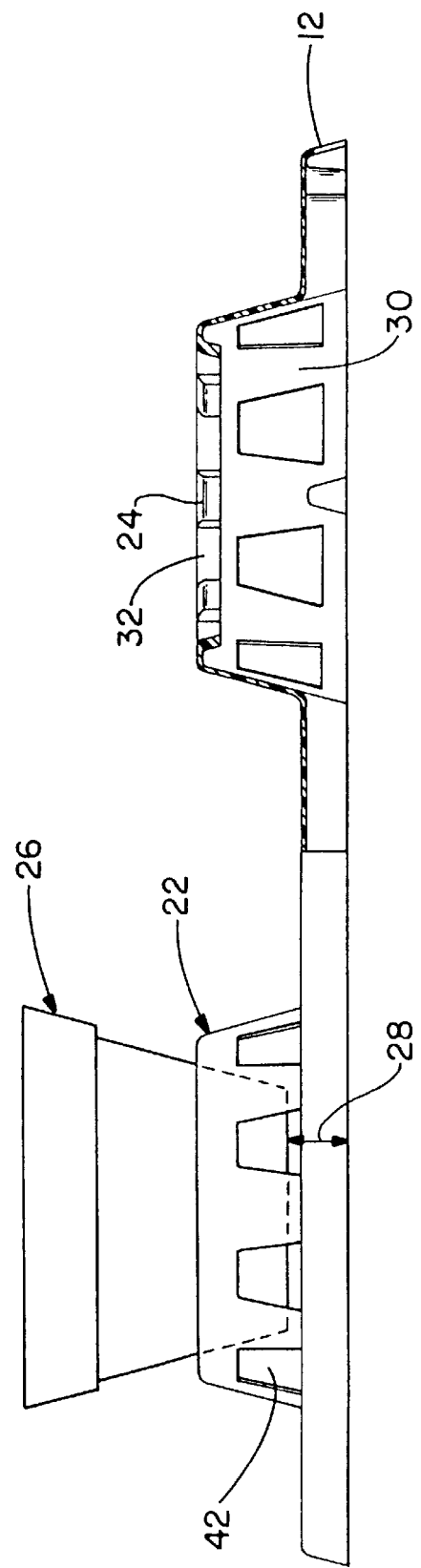
FIG. 2 is a side elevational view partially in section as may be taken at line 2—2 of FIG. 1.

Now referring to FIG. 2, the riser 22 of the plant tray is comprised of an upwardly extending sidewall 30 on top of which is an integrally formed ring 32. Preferably, within the ring 32 is a plurality of tabs 24 integrally formed into, or attached to the ring 32. The tabs 24 allow for correct sizing of the pot to the plant tray. These tabs 24 can be formed in various shapes and sizes to accommodate pots of varying sizes and shapes, to add to the versatility of the plant tray. The tabs 24 while supporting the pot when it is placed into the plant tray, also decreases the amount of surface contact between the pot and the plant tray, in turn lowering the friction between the plant tray and the pot so that the pot may be easily removed from the plant tray even after the pot has been left in the plant tray for long periods of time.

Figure 7:
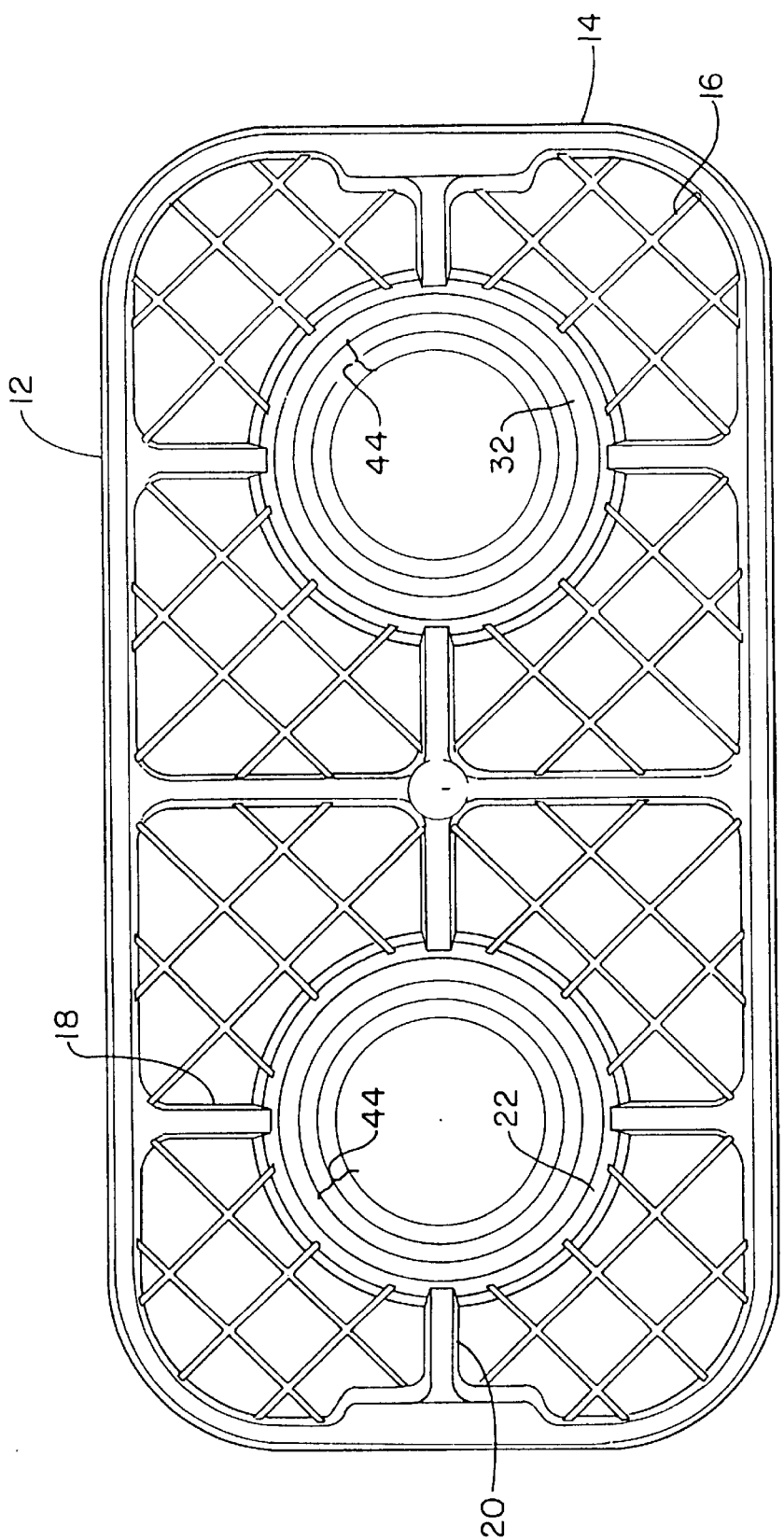
FIG. 7 is a top (plan) view of an alternative embodiment of the present invention.

As can be seen in FIG. 7, in an alternative embodiment of the present invention, concentric rings 44 are integrally attached to the inner surface of the ring 32 in order to support the pot when placed in the plant tray and still reduce the amount of surface tension between the plant tray and the pot.

Figure 6:
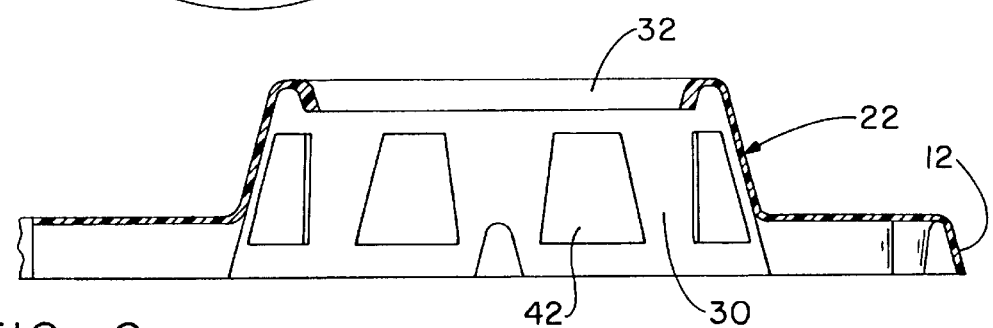
FIG. 6 is a greatly enlarged section view of the right end of the tray as seen in FIG. 2, showing an alternative embodiment of the present invention.

As can be seen in FIG. 6, in a third embodiment of the present invention, the inner surface of the ring 32 is angled inwardly to accept the placement of the pot.

As further can be seen in FIG. 2, as the pot 26 is placed into the plant tray an air space 28 is created between the bottom of the pot and the surface that the plant tray is placed upon. In the present embodiment of the this invention, the air space 28 created is approximately one half inch. The size of the air space 28 can be modified as necessary to accommodate different plant types and will also vary as different sized pots are placed in the plant tray. As is known, root tip growth stops when the root tip is exposed to the atmosphere, the air space 28 prevents the roots of the plant within the pot 26 from extending out of the bottom of the pot 26. By not having to trim exposed roots extending out from the bottom of the pot (air root pruning) or separating the plant from roots that have grown into the soil surrounding the plant, costs are lowered through time savings and decreased plant loss and damage. The air space 28 further aids in decreasing plant loss or damage by allowing for drainage of the pot. By draining the pot, causes of plant death such as salt build-up and root rot are inhibited, in turn lowering plant loss. Ventilation around the bottom of the pot 26 is further aided by the spaces 42 created in sidewall 30 of the riser 22. The size, shape and number of these spaces 42 can be varied to balance the structural support needed for different sized pots and the amount of ventilation required. Further, the spaces 42 serve to diffuse wind as it approaches the plant tray, thus making the plant tray more stable.

Figure 5:
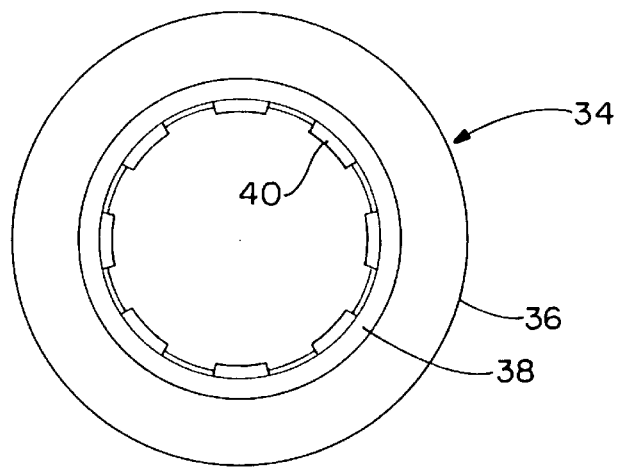
FIG. 5 is a top (plan) view of the diameter decreasing cap of the present invention.
Figure 4:
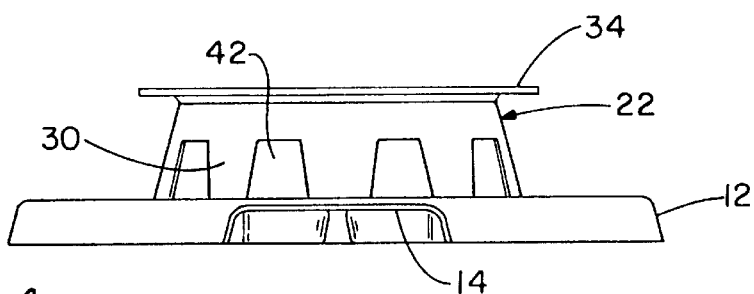
FIG. 4 is an end elevational view of the plant tray of the present invention.

As shown in FIGS. 4 and 5, when it is necessary to decrease the size of ring 32 in order to accommodate smaller sized pots, a size adapter 34 can be placed into the ring 32 of the riser 22 whether or not the ring 32 has tabs 24. The size adapter 34 is comprised of a flange 36 and a cap ring 38 optionally having tabs 40 within it. The size adapter 34 fits snugly into the ring 32 of the plant tray. The size adapter allows the grower to use the plant tray on a wider array of pot sizes without having to change the set up of the growing area.

Figure 3:
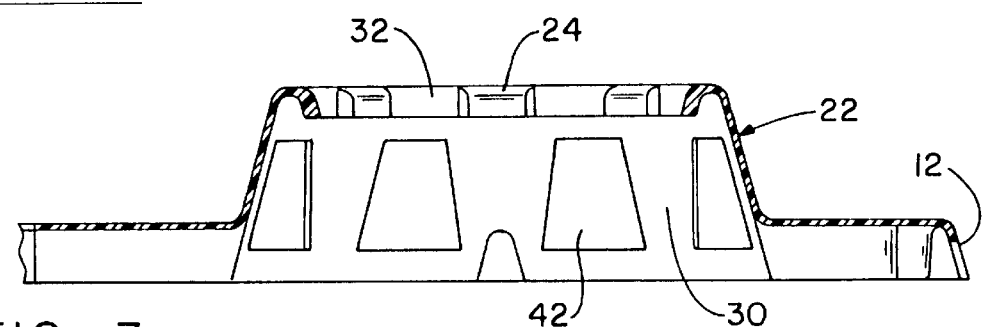
FIG. 3 is a greatly enlarged sectional view of the right end of the tray as seen in FIG. 2.

Referring now to FIGS. 2 and 3, the construction of the outside support rim 12, the lateral cross members 18 and the longitudinal cross member 20 of the plant tray is such that the under side of these members is concave. This feature allows the plant tray to nest on top of another identical tray. Further, the plant trays are manufactured so that similar plant trays are nestable on top of each other regardless of the diameter of the ring 32 that is formed into the plant tray so long as the size of the outer support rim 12 is the same. Nesting allows the plant trays to be stored in a directly vertical arrangement, therefore optimizing the use of the available storage space when trays are not in use.

The plant tray of the present invention can be manufactured by injection molding techniques such as are known in the art and from a variety of plastics that can be used in this type of molding such as polypropylene and polyethylene.

In use, the grower plants the individual plants or seeds into the desired size pot 26. When the plant is ready to be placed outside, the pot 26 is then placed into the appropriate size plant tray with risers 22 that can accommodate the pot 26. The plant tray is then placed in the growing area which could be soil, concrete or any other suitable flat surface where the plant is exposed to sunlight, watered and fertilized if desired. The plant tray is held onto the flat surface by the weight of the soil in the pot or by a stake if the flat surface is soil. If the plant tray is placed onto a flat surface other than soil, excess water, fertilizer, pesticide or herbicide can be collected and reused if possible or disposed of properly. The growing area can be covered by a sheet of plastic and/or designed in a manner that the excess solution(s) can be collected at a centralized container. When the plants have reached maturity or the stage at which the grower sells the plants to retailers, the pots 26 are removed from the plant tray and packed for transport to the retailers. The plant trays can then be collected and stored or reused as desired.

Other embodiments and variations of the preferred embodiments described herein will be apparent to those skilled in the art and may be made without departing from the spirit and scope of the invention as defined in the above description.

We claim:

1. A tray for planted pots comprising:

a spacer support rack with an outer support rim and at least one cross member to reinforce said outer support rim, a riser integrally attached to said spacer support rack, said riser having upwardly extending sidewalls, a plurality of air holes and a ring at the top most surface of said riser defining an aperture to receive a plant pot, and a means for supporting a potted plant in a manner that defines an air space between the bottom of said plant pot and a surface on which the plant tray is supported.

2. A tray for planted pots comprising:

a spacer support rack with an outer support rim and at least one cross member to reinforce said outer support rim, a riser integrally attached to said spacer support rack, said riser having upwardly extending sidewalls, a plurality of air holes and a ring at the top most surface of said riser defining an aperture to receive a plant pot, and an adapter means for adjustably decreasing the inner diameter of said ring of said riser, said adapter means comprising a flange and a cap ring having a means for supporting said plant pot in a manner that defines an air space between the bottom of said plant pot and a surface upon which the plant tray is supported.

3. A tray as recited in claim 2, wherein said supporting means is a plurality of tabs integrally attached within said ring of said adapter means.

4. A tray as recited in claim 2, wherein said supporting means is a plurality of concentric rings integrally attached within said ring of said adapter means.

5. A tray as recited in claim 2, wherein said supporting means is the ring of said size adapter wherein the inner surface of the ring of said size adapter is angled inwardly.

* * * * *